(12) United States Patent
Subramanian et al.

(10) Patent No.: US 12,367,151 B2
(45) Date of Patent: Jul. 22, 2025

(54) DATA PATH STRATEGIES FOR REPLICA VOLUMES

(71) Applicant: Dell Products L.P., Round Rock, TX (US)

(72) Inventors: Vasudevan Subramanian, Chapel Hill, NC (US); Vamsi K. Vankamamidi, Hopkinton, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/208,946

(22) Filed: Jun. 13, 2023

(65) Prior Publication Data

US 2024/0419603 A1 Dec. 19, 2024

(51) Int. Cl.
*G06F 12/0891* (2016.01)
*G06F 12/0882* (2016.01)
*G06F 12/123* (2016.01)

(52) U.S. Cl.
CPC ...... *G06F 12/0891* (2013.01); *G06F 12/0882* (2013.01); *G06F 12/123* (2013.01)

(58) Field of Classification Search
CPC ...... G05B 13/00–048; G05B 15/00–02; G05B 17/00–02; G06F 1/00–3296; G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825;
(Continued)

(56) References Cited

U.S. PATENT DOCUMENTS 5,978,791 A * 11/1999 Farber .................... G06F 16/13
707/961
6,928,442 B2 * 8/2005 Farber .................. G06F 16/174
709/219
(Continued)

OTHER PUBLICATIONS

Flushing dirty data from a writeback cache area; Veritas Access Administrator's Guide; Aug. 12, 2018; retrieved from https://www.veritas.com/support/en_US/doc/130195696-130508010-0/va_731_v127965021-130508010 on Jun. 8, 2024 (Year: 2018).*
(Continued)

*Primary Examiner* — Daniel C. Chappell
(74) *Attorney, Agent, or Firm* — BainwoodHuang (57) ABSTRACT

Techniques providing data path strategies for improving storage performance at DR sites. The techniques include receiving, in an asynchronous replication process, a large replication data transfer including data changes of a production volume since the last synchronization to a replica volume, partitioning the replication data into multiple small write requests, tagging each small write request as a write request to the replica volume, and performing early evicting, from cache memory, all cache pages used to cache host data specified in the small write requests; deep compression of contiguous host data specified in the small write requests; stream separation on the small write requests, each small write request being tagged as corresponding to a specific production site; and/or flushing host data having the same retention period to a specific region of physical storage space for the replica volume, each small write request being tagged with hint information indicating the retention period.

19 Claims, 4 Drawing Sheets

(58) Field of Classification Search
CPC ....... G06F 16/00–986; G06F 18/00–41; G06F 17/00–40; G06F 21/00–88; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153; G06N 3/00–126; G06N 5/00–048; G06N 7/00–08; G06N 10/00; G06N 20/00–20; G06N 99/00–007; G06T 1/00–60; G06V 30/00–43; G11B 20/00–24; G11B 33/00–1493; G11C 11/00–5692; G11C 13/00–06; G11C 14/00–009; G11C 15/00–06; G11C 16/00–3495; G11C 17/00–18; G11C 2207/00–229; G11C 2216/00–30; H01L 25/00–50; H01L 2225/00–1094; H03M 7/00–707; H04L 9/00–38; H04L 12/00–66; H04L 41/00–5096; H04L 49/00–9094; H04L 61/00–59; H04L 67/00–75

See application file for complete search history.

(56) References Cited

U.S. PATENT DOCUMENTS

| | | | | |
|---|---|---|---|---|
| 7,373,506 B2* | 5/2008 | Asano | | G11B 20/00557 |
| | | | | 713/168 |
| 7,945,539 B2* | 5/2011 | Farber | | G06F 16/13 |
| | | | | 707/689 |
| 8,286,019 B2* | 10/2012 | Murase | | G06F 3/0641 |
| | | | | 713/320 |
| 8,433,869 B1* | 4/2013 | Natanzon | | G06F 11/2069 |
| | | | | 707/634 |
| 8,478,955 B1* | 7/2013 | Natanzon | | G06F 11/2074 |
| | | | | 707/648 |
| 8,832,399 B1* | 9/2014 | Natanzon | | G06F 11/2074 |
| | | | | 711/112 |
| 8,954,667 B2* | 2/2015 | Dhuse | | H04L 67/1097 |
| | | | | 711/148 |
| 8,977,593 B1* | 3/2015 | Natanzon | | G06F 11/2074 |
| | | | | 707/634 |
| 9,043,548 B2* | 5/2015 | Grube | | G06F 3/0614 |
| | | | | 711/114 |
| 9,201,732 B2* | 12/2015 | Resch | | G06F 11/1088 |
| 9,460,185 B2* | 10/2016 | Swift | | G06F 16/278 |
| 9,619,179 B2* | 4/2017 | Milos | | G06F 3/0611 |
| 9,639,295 B1* | 5/2017 | Natanzon | | G06F 3/067 |
| 9,684,593 B1 | 6/2017 | Chen et al. | | |
| 9,990,388 B2* | 6/2018 | Meinecke | | G06F 16/214 |
| 10,331,630 B1* | 6/2019 | da Silveira Junior | | |
| | | | | G06F 16/183 |
| 10,359,935 B2* | 7/2019 | Resch | | G06F 3/0638 |
| 10,419,537 B1* | 9/2019 | da Silveira Junior | | |
| | | | | G06F 16/182 |
| 10,459,655 B1* | 10/2019 | Greenwood | | G06F 3/065 |
| 10,481,982 B2* | 11/2019 | Merriman | | G06F 16/2308 |
| 10,564,847 B1 | 2/2020 | Taylor et al. | | |
| 10,579,273 B2* | 3/2020 | Hutchison | | G06F 3/0647 |
| 10,620,850 B1 | 4/2020 | Xu et al. | | |
| 10,712,950 B2* | 7/2020 | Stefani | | G06F 3/0619 |
| 10,747,465 B2 | 8/2020 | Shang et al. | | |
| 10,768,850 B2* | 9/2020 | Muniswamy-Reddy | | |
| | | | | G06F 11/1471 |
| 10,956,990 B2* | 3/2021 | Zhang | | G06F 16/278 |
| 11,023,157 B2* | 6/2021 | Greenwood | | G06F 3/065 |
| 11,023,488 B1* | 6/2021 | Bono | | G06F 16/1824 |
| 11,061,931 B2* | 7/2021 | Sure | | G06F 16/182 |
| 11,106,538 B2* | 8/2021 | Merriman | | G06F 16/2308 |
| 11,226,745 B2* | 1/2022 | Sharma | | G06F 3/0619 |
| 11,269,745 B2* | 3/2022 | Lan | | G06F 11/2071 |
| 11,269,776 B2* | 3/2022 | Chen | | G06F 11/1453 |
| 11,281,387 B2 | 3/2022 | Tamilarasan et al. | | |
| 11,288,210 B2 | 3/2022 | Xu et al. | | |
| 11,343,314 B1* | 5/2022 | Muniswamy-Reddy | | |
| | | | | H04L 47/70 |
| 11,537,312 B2 | 12/2022 | Shalom et al. | | |
| 11,625,169 B2 | 4/2023 | Chen et al. | | |
| 11,635,897 B2 | 4/2023 | Shani et al. | | |
| 11,714,753 B2* | 8/2023 | Roozbeh | | G06F 12/0846 |
| | | | | 711/118 |
| 11,733,908 B2* | 8/2023 | Sun | | G06F 3/0655 |
| | | | | 710/1 |
| 2002/0052884 A1* | 5/2002 | Farber | | G06F 16/13 |
| 2002/0169971 A1* | 11/2002 | Asano | | G11B 20/0021 |
| | | | | 713/168 |
| 2003/0023847 A1* | 1/2003 | Ishibashi | | G11B 20/0021 |
| | | | | 713/169 |
| 2005/0033769 A1* | 2/2005 | Mifune | | G06F 40/166 |
| 2007/0088961 A1* | 4/2007 | Asano | | H04L 9/14 |
| | | | | 713/168 |
| 2008/0066191 A1* | 3/2008 | Farber | | G06F 16/13 |
| | | | | 726/28 |
| 2008/0071855 A1* | 3/2008 | Farber | | G06F 16/164 |
| | | | | 707/E17.14 |
| 2009/0083563 A1* | 3/2009 | Murase | | G06F 3/0608 |
| | | | | 713/324 |
| 2011/0185141 A1* | 7/2011 | Dhuse | | G06F 3/067 |
| | | | | 711/E12.002 |
| 2014/0344227 A1* | 11/2014 | Grube | | H04L 67/1097 |
| | | | | 707/812 |
| 2014/0344617 A1* | 11/2014 | Resch | | G06F 11/1088 |
| | | | | 714/6.31 |
| 2015/0039660 A1* | 2/2015 | Baptist | | G06F 3/067 |
| | | | | 707/827 |
| 2015/0039828 A1* | 2/2015 | Kazi | | G06F 3/0619 |
| | | | | 711/114 |
| 2015/0039969 A1* | 2/2015 | Motwani | | G06F 3/0644 |
| | | | | 714/766 |
| 2016/0371155 A1* | 12/2016 | Merriman | | G06F 16/2308 |
| 2017/0068454 A1* | 3/2017 | Motwani | | G06F 3/064 |
| 2017/0286008 A1* | 10/2017 | Kim | | G06F 3/0685 |
| 2020/0034053 A1* | 1/2020 | Sharma | | G06F 3/065 |
| 2020/0110831 A1* | 4/2020 | Sure | | G06F 16/13 |
| 2020/0252271 A1 | 8/2020 | Elliott, IV | | |
| 2022/0229734 A1 | 7/2022 | Seela et al. | | |
| 2022/0342766 A1 | 10/2022 | Brun-Cottan et al. | | |
| 2023/0384965 A1* | 11/2023 | Sun | | G06F 3/0626 |
| 2024/0045887 A1* | 2/2024 | VanBenschoten | | |
| | | | | G06F 16/2379 |
| 2024/0070145 A1* | 2/2024 | VanBenschoten | | |
| | | | | G06F 16/2379 |

OTHER PUBLICATIONS

The Cache Memory Book Second Edition; Jim Handy; Jan. 13, 1998; ISBN 0123229804 (Year: 1998).*

A. K. Pandey, A. Kumar, N. Malviya and B. Rajendran, "A Survey of Storage Replication Software," 2014 3rd International Conference on Eco-friendly Computing and Communication Systems, Mangalore, India, 2014, pp. 45-50, doi: 10.1109/Eco-friendly.2014. 85. (Year: 2014).*

* cited by examiner

DATA PATH STRATEGIES FOR REPLICA VOLUMES

BACKGROUND

Storage systems include processing circuitries and storage arrays containing storage devices such as solid-state drives (SSDs), flash drives, and/or hard disk drives (HDDs). The processing circuitries perform input/output (IO) operations in response to storage IO requests (e.g., read requests, write requests) issued over a network by host computers coupled to the storage systems. The IO operations (e.g., read operations, write operations) cause host data including data blocks, data pages, data files, or other data elements specified in the storage IO requests to be read from or written to volumes (VOLs), logical units (LUs), filesystems, or other storage objects or resources stored on the storage devices. To provide backup or remote storage of host data, the storage systems perform asynchronous replication to replicate or write the host data on production volumes stored at a production site to replica volumes stored at a disaster recovery (DR) site.

SUMMARY

A storage system can perform asynchronous replication of host data on production volumes based on a recovery point objective (RPO), which can represent a maximum amount of data that a user of the storage system would be willing to lose in the event of a failure or disaster at a production site where the production volumes are stored. The RPO can determine a minimum frequency of asynchronous replication, which can be represented by a specified RPO interval such as 5 minutes, 15 minutes, or any other suitable interval. During periods between successive synchronizations, the storage system may make changes to the host data on the production volumes. The storage system can replicate or write some or all changes made to the host data since the most recent synchronization to replica volumes stored at a DR site, in accordance with the specified RPO interval, thereby generating, for each RPO interval, consistent snapshots of the replica volumes. The host data can be read from the replica volumes when a disaster recovery test or an actual disaster recovery is performed at the DR site, or when a failover is performed due to a failure or planned maintenance at the production site. However, host data tends typically to be mostly written to such replica volumes, rather than read from the replica volumes. If any of the snapshots of the replica volumes are not used within a certain period, then they can be unmapped and deleted from storage at the DR site.

Techniques are disclosed herein that provide data path strategies for improving the performance and/or efficiency of storage systems deployed at DR sites. The disclosed techniques can be practiced in a storage environment that includes a source storage system (or "source node") deployed at a production site and a destination storage system (or "destination node") deployed at a DR site, which can be a mixed-use DR site configured to store production volumes as well as replica volumes. In the disclosed techniques, the source node can perform asynchronous replication of host data on a production volume stored at the production site, replicating or writing some or all changes made to the host data at specific offsets of the production volume since the most recent synchronization to a replica volume stored at the DR site, in accordance with a specified RPO interval. The disclosed techniques can include reading the data changes at the specific offsets of the production volume, accumulating the data changes for a "large" (e.g., a 512 kilobyte (Kb)) replication data transfer from the source node at the production site to the destination node at the DR site. In the disclosed techniques, the large replication data transfer can include multiple "small" write requests of various sizes (e.g., 4 Kb, 16 Kb, 64 Kb), some of which can be logically contiguous based on offset. The disclosed techniques can include, upon receipt of the large replication data transfer at the destination node, partitioning it into a plurality of small write requests, keeping any logically contiguous data together as part of the same write request; tagging each small write request as a write request to the replica volume; and, in response to each tagged small write request, performing a write operation to write a data change at a specific offset to the replica volume.

In certain asynchronous replication scenarios, the disclosed techniques can leverage host data being mostly written to, rather than read from, replica volumes stored at a mixed-use DR site. In one scenario, each write operation performed in response to a tagged small write request can write a data change at a specific offset of a replica volume to a cache page in cache memory of a destination node. The disclosed techniques can include flushing data written to the cache page from the cache memory to the replica volume, early evicting the cache page from the cache memory, and either returning the cache page to a free page list of the cache memory or placing the cache page at the head of a least recently used (LRU) list of the cache memory. In this way, IO operations directed to production volumes stored at the mixed-use DR site can be benefited by freeing-up such cache pages sooner.

In another scenario, a large replication data transfer to a replica volume can specify a large range or amount (e.g., up to 512 Kb or more) of contiguous host data. The disclosed techniques can include performing deep compression on the contiguous host data before flushing the host data to the replica volume. Because host data is mostly written to, rather than read from, replica volumes stored at the DR site, any read penalty resulting from performing such deep compression on contiguous host data is likely to be low.

In still another scenario, in addition to being tagged as a write request to a replica volume, each small write request to the replica volume can also be tagged to identify or indicate a production site where a corresponding source node is deployed. In this scenario, the production site may be one of several production sites, in which each production site mandates a different class of service (CoS) for providing backup or remote storage of host data on its production volumes. The disclosed techniques can include, upon receipt of a large replication data transfer at a destination node, partitioning it into a plurality of small write requests, tagging each small write request as a write request to a replica volume, and further tagging the small write request as corresponding to a specific production site. The disclosed techniques can include performing stream separation on a plurality of such multi-tagged small write requests based at least on specific production sites identified or indicated in the respective write requests, and, for each resulting stream of small write request transactions, performing write operations to write data changes at specific offsets to the replica volume for subsequent storage to a storage tier that conforms to the CoS mandated by the specific production site.

In yet another scenario, each large transfer of replication data can be tagged with hint information pertaining to a retention period for host data to be written to a replica volume at the DR site. The disclosed techniques can include reading changes made to host data at specific offsets of a production volume since the most recent synchronization to the replica volume, accumulating the data changes in a large replication data transfer to the replica volume, tagging the large transfer of replication data with hint information pertaining to a retention period for the accumulated data changes, and sending the tagged large transfer of replication data from a source node to a destination node. The disclosed techniques can include, upon receipt of the tagged large transfer of replication data at the destination node, partitioning it into a plurality of small write requests, tagging each small write request as a write request to the replica volume, and further tagging the small write request with the hint information pertaining to the retention period of the host data. The disclosed techniques can include flushing host data having the same retention period to a specific region of physical storage space (e.g., a physical large block (PLB)) for the replica volume. Because host data having the same retention period can be flushed to the same PLB for the replica volume, subsequent deletion of the host data from the PLB at the expiration of the retention period can be more efficiently performed.

By receiving, in an asynchronous replication process, a large transfer of replication data including accumulated changes made to data of a production volume since the most recent synchronization to a replica volume, partitioning the large transfer of replication data into a plurality of small write requests, tagging each small write request as a write request to the replica volume, and, in response to servicing the plurality of small write requests, performing one or more of (i) early evicting, from cache memory, all cache pages used to cache host data specified in the plurality of small write requests, (ii) deep compression of contiguous host data specified in the plurality of small write requests, (iii) stream separation on the plurality of small write requests, each small write request being further tagged as corresponding to a specific production site, and (iv) flushing host data having the same retention period to a specific region of physical storage space for the replica volume, each small write request being further tagged with hint information pertaining to the retention period, the performance and/or efficiency of storage systems deployed at DR sites can be improved.

In certain embodiments, a method of improving performance and/or efficiency of storage systems deployed at disaster recovery (DR) sites includes receiving, at a destination node of a DR site from a source node at a production site, a large transfer of replication data including accumulated changes made to data of a production volume since a most recent synchronization to a replica volume in an asynchronous replication process; partitioning the large transfer of replication data into a plurality of small write requests; tagging each small write request as a write request to the replica volume; and, in response to servicing the plurality of small write requests, performing one or more of (i) early evicting, from cache memory, all cache pages used to cache host data specified in the plurality of small write requests, (ii) deep compression of contiguous host data specified in the plurality of small write requests, (iii) stream separation on the plurality of small write requests, each small write request being further tagged as corresponding to a specific production site, and (iv) flushing host data having the same retention period to a specific region of physical storage space for the replica volume, each small write request being further tagged with hint information pertaining to the retention period are performed.

In certain arrangements, the method includes writing the changes made to data of the replica volume to a cache page in the cache memory.

In certain arrangements, the changes made to the data written to the cache page are marked as being targeted to the replica volume. The method includes flushing the marked changes from the cache memory to the replica volume, and evicting the cache page from the cache memory in response to flushing the marked changes from the cache memory to the replica volume.

In certain arrangements, the method includes returning the cache page to a free page list of the cache memory.

In certain arrangements, the method includes placing the cache page at a head of a least recently used (LRU) list of the cache memory.

In certain arrangements, the method includes performing inline deep compression of the contiguous host data at the DR site.

In certain arrangements, the method includes writing a compressed version of the host data to a cache page in the cache memory.

In certain arrangements, the method includes flushing the compressed version of the host data from the cache memory to the replica volume.

In certain arrangements, the method includes tagging each small write request with a production site identifier (ID) identifying the production site where the source node is deployed.

In certain arrangements, the method includes tagging each small write request with the production site ID.

In certain arrangements, the method includes performing inline stream separation on the plurality of small write requests based at least on the production site ID.

In certain arrangements, the production site mandates a specific class of service (CoS) for providing backup or remote storage of host data. The method includes, for each stream of small write request transactions resulting from performing the stream separation, performing write operations to write, to the replica volume, the changes made to the data of the replica volume for subsequent storage to a storage tier that conforms to the specific CoS mandated by the production site.

In certain arrangements, the large transfer of replication data is tagged with hint information pertaining to a retention period for the host data. The method includes tagging each small write request with the hint information pertaining to the retention period for the host data.

In certain arrangements, the method includes flushing the host data having the same retention period to a specific region of physical storage space for the replica volume.

In certain embodiments, a system for improving performance and/or efficiency of storage systems deployed at disaster recovery (DR) sites includes a memory and processing circuitry configured to execute program instructions out of the memory to receive, at a destination node of a DR site from a source node at a production site, a large transfer of replication data including accumulated changes made to data of a production volume since a most recent synchronization to a replica volume in an asynchronous replication process, partition the large transfer of replication data into a plurality of small write requests, tag each small write request as a write request to the replica volume, and, in response to servicing the plurality of small write requests, perform one or more of (i) early evicting, from cache memory, all cache pages used to cache host data specified in the plurality of small write requests, (ii) deep compression of contiguous host data specified in the plurality of small write requests, (iii) stream separation on the plurality of small write requests, each small write request being further tagged as corresponding to a specific production site, and (iv) flushing host data having the same retention period to a specific region of physical storage space for the replica volume, each small write request being further tagged with hint information pertaining to the retention period are performed.

In certain arrangements, the processing circuitry is configured to execute the program instructions out of the memory to write the changes made to data of the replica volume to a cache page in the cache memory, and perform one of (i) returning the cache page to a free page list of the cache memory, and (ii) placing the cache page at a head of a least recently used (LRU) list of the cache memory.

In certain arrangements, the processing circuitry is configured to execute the program instructions out of the memory to perform inline deep compression of the contiguous host data at the DR site.

In certain arrangements, the processing circuitry is configured to execute the program instructions out of the memory to tag each small write request with a production site identifier (ID) identifying the production site where the source node is deployed, and perform inline stream separation on the plurality of small write requests based at least on the production site ID.

In certain arrangements, the large transfer of replication data is tagged with hint information pertaining to a retention period for the host data, and the processing circuitry is configured to execute the program instructions out of the memory to tag each small write request with the hint information pertaining to the retention period for the host data, and flush the host data having the same retention period to a specific region of physical storage space for the replica volume.

In certain embodiments, a computer program product includes a set of non-transitory, computer-readable media having instructions that, when executed by processing circuitry, cause the processing circuitry to perform a method that includes receiving, at a destination node of a DR site from a source node at a production site, a large transfer of replication data including accumulated changes made to data of a production volume since a most recent synchronization to a replica volume in an asynchronous replication process, partitioning the large transfer of replication data into a plurality of small write requests, tagging each small write request as a write request to the replica volume, and, in response to servicing the plurality of small write requests, performing one or more of (i) early evicting, from cache memory, all cache pages used to cache host data specified in the plurality of small write requests, (ii) deep compression of contiguous host data specified in the plurality of small write requests, (iii) stream separation on the plurality of small write requests, each small write request being further tagged as corresponding to a specific production site, and (iv) flushing host data having the same retention period to a specific region of physical storage space for the replica volume, each small write request being further tagged with hint information pertaining to the retention period are performed.

Other features, functions, and aspects of the present disclosure will be evident from the Detailed Description that follows.

BRIEF DESCRIPTION OF THE DRAWINGS

The foregoing and other objects, features, and advantages will be apparent from the following description of particular embodiments of the present disclosure, as illustrated in the accompanying drawings, in which like reference characters refer to the same parts throughout the different views.

DETAILED DESCRIPTION

Techniques are disclosed herein that provide data path strategies for improving the performance and/or efficiency of storage systems deployed at disaster recovery (DR) sites. The disclosed techniques can include receiving, in an asynchronous replication process, a "large" transfer of replication data including accumulated changes made to data of a production volume since the most recent synchronization to a replica volume, partitioning the large transfer of replication data into a plurality of "small" write requests, and tagging each small write request as a write request to the replica volume. The disclosed techniques can further include, in response to servicing the plurality of small write requests, performing one or more of (i) early evicting, from cache memory, all cache pages used to cache host data specified in the plurality of small write requests, (ii) deep compression of contiguous host data specified in the plurality of small write requests, (iii) stream separation on the plurality of small write requests, each small write request being further tagged as corresponding to a specific production site, and (iv) flushing host data having the same retention period to a specific region of physical storage space for the replica volume, each small write request being further tagged with hint information pertaining to the retention period. In this way, the performance and/or efficiency of storage systems deployed at DR sites can be improved.

Figure 1:
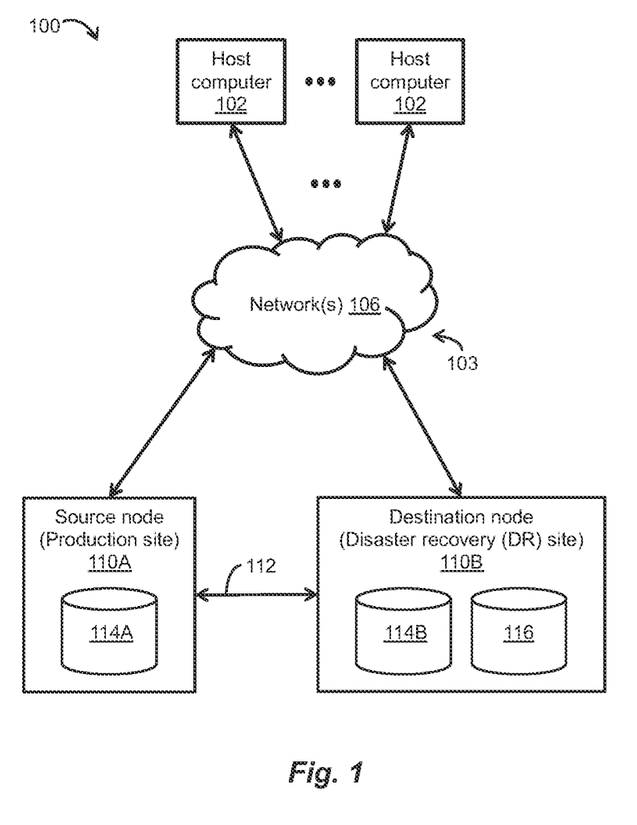
FIG. 1 is a block diagram of an exemplary storage environment, in which techniques can be practiced for providing data path strategies that can improve the performance and/or efficiency of storage systems deployed at disaster recovery (DR) sites.

FIG. 1 depicts an illustrative embodiment of an exemplary storage environment 100, in which techniques can be practiced for providing data path strategies that can improve the performance and/or efficiency of storage systems deployed at DR sites. As shown in FIG. 1, the storage environment 100 can include a plurality of host computers 102, a source storage system (or "source node") 110A, a destination storage system (or "destination node") 110B, and a communications medium 103 that includes at least one network 106. For example, each of the plurality of host computers 102 may be configured as a web server computer, a file server computer, an email server computer, an enterprise server computer, and/or any other suitable client/server computer or computerized device. The plurality of host computers 102 can be configured to provide, over the network(s) 106, storage input/output (IO) requests (e.g., small computer system interface (SCSI) commands, network file system (NFS) commands) to the source node 110A and/or the destination node 110B. For example, each storage IO request (e.g., read request, write request) may direct the source node 110A and/or the destination node 110B to read or write data blocks, data pages, data files, and/or any other suitable data elements (also referred to herein as "host data") to/from volumes (VOLs), virtual volumes (VVOLs) (e.g., VMware® VVOLs), logical units (LUs or LUNs), filesystems, directories, files, and/or any other suitable storage objects maintained in association with the source node 110A and/or the destination node 110B.

In one embodiment, the source node 110A can be deployed at a production site where at least one production volume 114A is stored, and the destination node 110B can be deployed at a disaster recovery (DR) site where at least one production volume 116, as well as at least one replica volume 114B, are stored. As such, the DR site is referred to herein as a mixed-use DR site, which can store both production volumes and replica volumes. In this embodiment, the replica volume 114B can be obtained at the DR site in an asynchronous replication process. Such an asynchronous replication process can include, in response to a write request issued to the source node 110A by one of the host computers 102, performing a write operation to write host data to the production volume 114A, acknowledging completion of the write operation to the host computer 102, and, having acknowledged the completion of the write operation, asynchronously performing a large transfer of replication data to the replica volume 114B.

Figure 2:
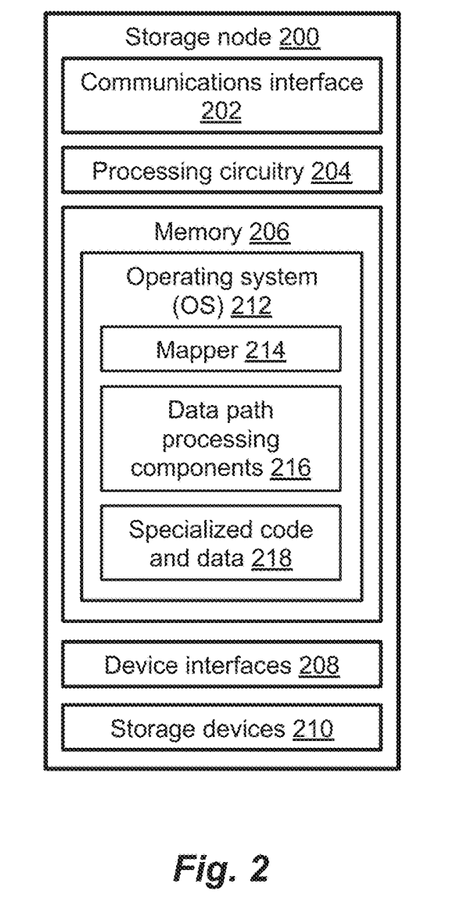
FIG. 2 is a block diagram of an exemplary storage node that can be included in a storage system within the storage environment of FIG. 1.

FIG. 2 depicts an exemplary configuration of a storage node 200. It is noted that each of the source node 110A and the destination node 110B (see FIG. 1) can be configured like the storage node 200 (see FIG. 2). As shown in FIG. 2, the storage node 200 can include a communications interface 202, processing circuitry 204, a memory 206, device interfaces 208, storage devices 210, and/or any other suitable storage node component(s). The communications interface 202 can include an InfiniBand interface, an Ethernet interface, an IEEE 802.11x (WiFi) interface, a Bluetooth interface, and/or any other suitable communications interface. The communications interface 202 can further include SCSI target adapters, network interface adapters, and/or any other suitable adapters for converting electronic, optical, and/or wireless signals received over the network 106 to a form suitable for use by the processing circuitry 204.

The memory 206 can include non-persistent memory (e.g., dynamic random-access memory (DRAM), static random-access memory (SRAM)) and/or persistent memory (e.g., flash memory, magnetic memory). The memory 206 can be configured to store a variety of software constructs including a mapper module (or "mapper") 214, data path processing components 216 (see also FIG. 3a), and other specialized code and data 218 (e.g., deep compression code and data, stream separation code and data), each of which can be executed by the processing circuitry 204 as program instructions within an operating system 212 to carry out the techniques disclosed herein. For example, the operating system (OS) 212 may be implemented as a Linux OS, Unix OS, Windows OS, or any other suitable operating system. The mapper 214 can employ a tree structure for storing host data to VOLs, VVOLs, LUs, LUNs, filesystems, directories, and/or files to the storage devices 210 (e.g., SSDs, flash drives, HDDs). In one embodiment, the tree structure can be configured as a B-tree structure that includes multiple levels for accommodating root pages, top pages, middle (or "mid") pages, leaf pages, virtual large blocks (VLBs), and physical large blocks (PLBs). The root pages can be configured to provide a logical address space with pointers to respective ones of the top pages, which can be configured with pointers to respective ones of the mid-pages. Further, the mid-pages can be configured with pointers to respective ones of the leaf pages, which can be configured with pointers to the VLBs. The VLBs can include reference counts, data compression maps, and/or accounting information for the PLBs, each of which can be configured to provide a two (2) megabyte (Mb) physical space for storing the host data.

The processing circuitry 204 can include one or more physical processors and/or engines configured to execute the software constructs (e.g., the OS 212, the mapper 214, the data path processing components 216, the specialized code and data 218) stored in the memory 206, as well as data movers, director boards, blades, IO modules, drive controllers, switches, and/or any other suitable computer hardware or combination thereof. For example, the processing circuitry 204 may execute the program instructions out of the memory 206, process storage IO requests (e.g., read requests, write requests) from the host computers 102, and store host data to the storage devices 210 within the storage environment 100, which can be a clustered RAID environment.

The device interfaces 208 can be configured to facilitate data transfers to/from the storage devices 210. The device interfaces 208 can include device interface modules such as disk adapters, disk controllers, or other backend components configured to interface with the physical storage devices 210 (e.g., SSDs, flash drives, HDDs). The device interfaces 208 can be configured to perform data operations using a RAM cache included in the memory 206 when communicating with the storage devices 210, which can be incorporated into a storage array.

In the context of the processing circuitry 204 being configured to execute the software constructs (e.g., the mapper 214, the data path processing components 216, the specialized code and data 218) as program instructions out of the memory 206, a computer program product can be configured to deliver all or a portion of the program instructions to the processing circuitry 204. Such a computer program product can include one or more non-transient computer-readable storage media, such as a magnetic disk, a magnetic tape, a compact disk (CD), a digital versatile disk (DVD), an optical disk, a flash drive, a solid state drive (SSD), a secure digital (SD) chip or device, an application specific integrated circuit (ASIC), a field programmable gate array (FPGA), and so on. The non-transient computer-readable storage media can be encoded with sets of program instructions for performing, when executed by the processing circuitry 204, the various techniques disclosed herein.

During operation, the disclosed techniques can provide data path strategies for improving the performance and/or efficiency of storage systems deployed at disaster recovery (DR) sites, such as the destination node 110B deployed at the mixed-use DR site. The disclosed techniques can include performing an asynchronous replication process to replicate host data on the production volume 114A stored at the production site, writing some or all changes made to the host data at specific offsets of the production volume 114A since the most recent synchronization to the replica volume 114B stored at the DR site, in accordance with a specified recovery point objective (RPO) interval. The disclosed techniques can include, at the source node 110A, reading the data changes at the specific offsets of the production volume 114A, accumulating the data changes for a large (e.g., a 512 kilobyte (Kb)) replication data transfer from the source node 110A at the production site over the communication path 112 to the destination node 110B at the DR site. For example, the large replication data transfer may specify a 16 Kb chunk at a first offset, a 4 Kb chunk at a second offset, a 64 Kb chunk at a third offset, and so on. Further, some of the data chunks specified in the large replication data transfer may be logically contiguous based on offset. The disclosed techniques can include, upon receipt of the large replication data transfer at the destination node 110B, partitioning it into a plurality of small (e.g., 4 Kb, 16 Kb, 64 Kb, and so on) write requests, keeping any logically contiguous data together as part of the same write request; tagging each small write request as a write request to the replica volume 114B; and, in response to each tagged small write request, performing a write operation to write a data change at a specific offset to the replica volume 114B. As set forth below with reference to an illustrative example, in certain asynchronous replication scenarios, the disclosed techniques can improve the performance and/or efficiency of the destination node 110B deployed at the DR site by leveraging host data being mostly written to, rather than read from, replica volumes stored at the DR site.

The disclosed techniques will be further understood with reference to the following illustrative example and FIGS. 1, 2, 3a, 3b, and 4. In this example, it is assumed that the source node 110A (see FIG. 1) has sent, to the destination node 110B (see FIG. 1), a large transfer of replication data, which can have a size of 512 Kb or any other suitable size. It is further assumed that the large transfer of replication data includes changes made to host data at specific offsets of the production volume 114A since the most recent synchronization to the replica volume 114B, in accordance with a specified RPO interval such as 5 minutes or any other suitable interval. For example, the source node 110A may take a snapshot of the production volume 114A at time T0, refresh the snapshot of the production volume 114A at time T0 plus 2.5 minutes (or "T0+2.5"), and perform a snapshot difference (or "snap diff") operation to obtain snap diff information specifying the data changes at various offsets of the production volume 114A during the elapsed period between the taking of the snapshot at time T0 and the refreshing of the snapshot at time T+2.5. In this example, during the remaining 2.5 minutes of the 5-minute RPO interval, a large replication data transfer operation can be performed to send the data changes from the source node 110A to the destination node 110B. The large replication data transfer operation includes reading the data changes at the various offsets of the production volume 114A, accumulating the data changes for a large replication data transfer to the replica volume 114B, and sending the large transfer of replication data from the source node 114A over the communication path 112 to the destination node 110B.

Figure 3A:
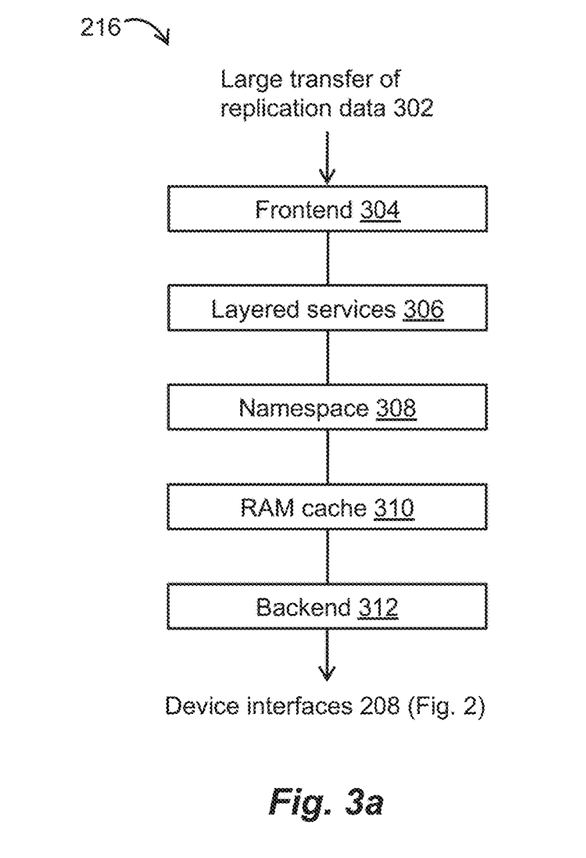
FIG. 3*a* is a block diagram of an exemplary hardware/software stack that can be included in a data path of the storage node of FIG. 2.

FIG. 3a depicts an exemplary configuration of the data path processing components 216 of the storage node 200 (see FIG. 2). As described herein, the destination node 110B, as well as the source node 110A, can be configured like the storage node 200 of FIG. 2. As shown in FIG. 3a, the data path processing components 216 can be configured as a hardware/software stack that includes a frontend component (or "frontend") 304, layered services 306, namespace components (or "namespace") 308, a RAM cache 310, and a backend component (or "backend") 312. Such a data path can be characterized as the path or flow of IO through the destination node 110B. For example, the data path may correspond to the logical flow through software and/or hardware components of the destination node 110B in connection with a user. In an asynchronous replication scenario, such a user can be an application running on the source node 110A that generates and sends the large transfer of replication data (e.g., a large transfer of replication data 302; see FIG. 3a) to the destination node 110B. In this example, upon receipt of the large transfer of replication data 302 at the destination node 110B, the frontend 304 translates it from a protocol-specific data transfer into a storage node-specific data transfer, and passes the large transfer of replication data 302 to the layered services 306.

Figure 3B:
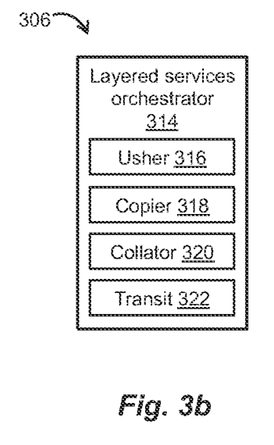
FIG. 3*b* is a block diagram of exemplary layered services that can be included in the hardware/software stack of FIG. 3*a;*

FIG. 3b depicts an exemplary configuration of the layered services 306, which can be included in the data path processing components 216 of FIG. 3a. As shown in FIG. 3b, the layered services 306 can include a layered services orchestrator 314, which determines data path processing components to be dynamically included in the hardware/software stack of FIG. 3a. In this example, the data path processing components include an usher component (or "usher") 316, a copier component (or "copier") 318, a collator 320, and a transit component (or "transit") 322. The usher 316 receives the large transfer of replication data 302 specifying the data changes from the frontend 304, and obtains a namespace object from the namespace 308 for use in writing the replication data to the replica volume 114B. The copier 318 reads the replication data from the namespace object and provides the replication data to the collator 320, which un-marshals, unpacks, and/or partitions the replication data to create or obtain a plurality of small write requests, each of which can have a size of 4 Kb or any other suitable size.

Figure 4:
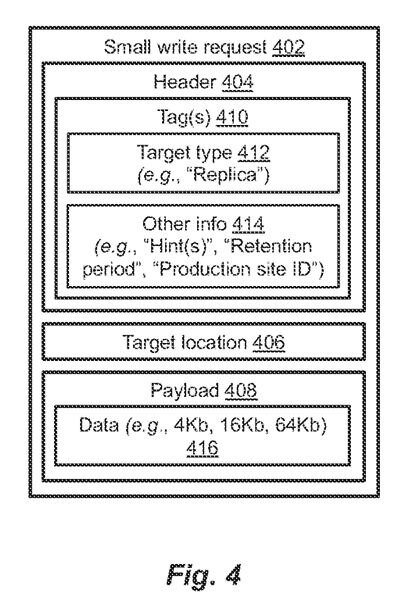
FIG. 4 is a block diagram of an exemplary small write request that can be generated by the storage node of FIG. 2.

FIG. 4 depicts an exemplary small write request 402. It is noted that each small (e.g., 4 Kb) write request created or obtained by the storage node 200 of FIG. 2 can be configured like the small write request 402 of FIG. 4. In this example, the small write request 402 includes a header 404, a target location 406, and a payload 408. The header 404 of the small write request 402 includes one or more tags 410 indicating a target type 412 (e.g., "replica"), as well as optionally other information 414 (e.g., "hint(s)", "production site identifier (ID)", "retention period"). For example, such tag and/or hint information may be implemented as an enumerated (or "enum") value, which may be added to a small write request at a collator level of layered services for data path processing. The target location 406 identifies a location of the replica volume 114B at the DR site. For example, the target location 406 may be expressed in terms of a logical unit number (LUN) and a logical address or offset location (e.g., a logical block address (LBA)). The payload 408 of the small write request 402 contains partitioned replication data to be written to the replica volume 114B at the target location 406. Having tagged the small write request 402 with the target type 412 (e.g., "replica"), the data contained in the payload 408 of the small write request 402 is written to a cache page in the RAM cache 310 (see FIG. 3a), and marked as being targeted to a "replica", namely, the replica volume 114B (see FIG. 1). At a later point in time, the backend 312, via the device interfaces 208 (see FIG. 2), de-stages or flushes the data from the cache page to physical storage space (e.g., a PLB) for the replica volume 114B. It is noted that the transit 322 included in the data path processing components of FIG. 3b can be configured as an abstraction layer for supported protocols (e.g., SCSI, NFS, TCP, NVMe-oF) of the source and destination nodes 110A, 110B, which can use the transit 322 to communicate with each other over the communication path 112.

In certain asynchronous replication scenarios, the disclosed techniques can improve the performance and/or efficiency of the destination node 110B deployed at the DR site by leveraging host data being mostly written to, rather than read from, replica volumes stored at the DR site. In one scenario, each write operation performed by the destination node 110B in response to a tagged small write request (e.g., the small write request 402; see FIG. 4) can write data changes at specific offsets of the replica volume 114B to a cache page in the RAM cache 310 (see FIG. 3a). As described in this example, the data contained in the payload 408 of the small write request 402 and written to a cache page in the RAM cache 310 is marked as being targeted to a "replica" such as the replica volume 114B. As such, the destination node 110B flushes the marked data written to the cache page from the RAM cache 310 to the replica volume 114B, and, having flushed and invalidated the data, early evicts the cache page from the RAM cache 310 due to the low probability of the data subsequently being read. In this example, the destination node 110B either returns the clean cache page to a free page list of the RAM cache 310 or places the clean cache page at the head of a least recently used (LRU) list of the RAM cache 310. For example, the free page list may identify free or unused physical locations on an SSD or flash drive. It is noted that clean cache pages on the free page list may be reused at any time. Further, the age of a cache page placed on the LRU list may be determined based on the last time the cache page was accessed in connection with an IO operation. In this way, IO operations directed to production volumes (e.g., the production volume 116; see FIG. 1) stored at the mixed-use DR site can be benefited by such cache pages being made free and available sooner for storing other cached data.

In another scenario, a large transfer of replication data to the replica volume 114A can include a large range or amount of contiguous host data, making the large transfer of replication data to the replica volume 114A a good candidate for inline deep compression. For example, such inline deep compression techniques performed on contiguous host data may provide a higher level of data compression (e.g., a higher compression ratio), thereby producing a more highly compressed version of the host data. In this example, because asynchronous replication is based on a recovery point objective (RPO), write requests issued by the host computers 102 to the production volume 114A are accumulated by the source node 110A over an RPO interval at the production site. Based on the locality of the host data specified in the write requests, the production volume 114A can have large range or amount (e.g., 64 Kb, 128 Kb, 256 Kb) of logically contiguous data blocks written to it during the RPO interval. In this example, asynchronous replication is further based on snap diff technology, which can be used to determine differences between a first snapshot taken of the production volume 114A during the current RPO interval and a second snapshot taken of the production volume 114A during a prior RPO interval. The source node 110A can accumulate the differences between the first and second snapshots of the production volume 114A in a large transfer of replication data to the replica volume 114B, and send the large replication data transfer to the destination node 110B over the communication path 112. The destination node 110B can then perform inline deep compression on the contiguous host data contained in the large replication data transfer, and flush the highly compressed version of the host data to the replica volume 114A. Because host data is mostly written to, rather than read from, replica volumes stored at the DR site, any read penalty resulting from performing such inline deep compression on contiguous host data can be assumed to be low.

In still another scenario, in addition to being tagged with the target type 412, "replica" (see FIG. 4), each small write request (e.g., the small write request 402; see FIG. 4) to the replica volume 114B can also be tagged to identify or indicate a production site where a corresponding source node is deployed. For example, the production site may be one of several production sites, in which each production site mandates a different class of service (CoS) for providing backup or remote storage of host data on its production volumes. In this example, upon receipt of a large transfer of replication data, the destination node 110B partitions it into a plurality of small write requests, tags each small write request with the target type, "replica", and further tags the small write request with the other information 414 indicating the production site ID where the source node 110A is deployed. The destination node 110B then performs inline stream separation on the multi-tagged small write requests based on target type ("replica") and the production site ID, and, for each resulting stream of small write request transactions, performs write operations to write data changes at specific offsets to the replica volume for subsequent storage to a storage tier (e.g., an SSD tier, a flash tier, an IDD tier, a cloud tier) that conforms to the CoS mandated by the identified production site.

In yet another scenario, each large transfer of replication data can be tagged with hint information pertaining to a retention period for host data to be written to a replica volume at the DR site. For example, the retention period may indicate a period of time (e.g., hour(s), day(s), week(s), year(s)) for which the host data may not be deleted. In this example, the source node 110A obtains changes made to host data at specific offsets of the production volume 114A since the most recent synchronization to the replica volume 114B, accumulates the data changes in a large transfer of replication data to the replica volume 114B, tags the large transfer of replication data with the hint information pertaining to the retention period for the host data, and sends the tagged large transfer of replication data to the destination node 110B. Upon receipt of the tagged large replication data transfer at the DR site, the destination node 110B partitions it into a plurality of small write requests (e.g., the write request 402; see FIG. 4), tags each small write request with the target type, "replica", and further tags the small write request with the hint information pertaining to the retention period of the host data. The destination node 110B subsequently flushes the host data having the same retention period to a specific region of physical storage space (e.g., a 2 Mb PLB) for the replica volume 114B. Because host data having the same retention period can be flushed to the same PLB for a replica volume, subsequent deletion of the host data from the PLB at the expiration of the retention period can be performed more efficiently.

Figure 5:
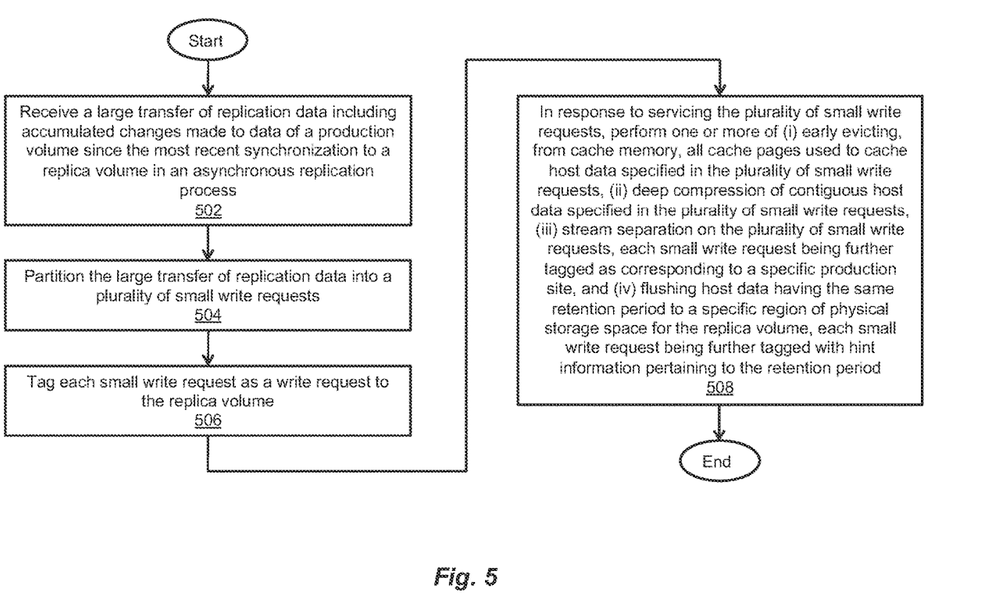
FIG. 5 is a flow diagram of an exemplary method of a data path strategy for improving the performance and/or efficiency of storage systems deployed at DR sites.

A method of a data path strategy for improving the performance and/or efficiency of storage systems deployed at disaster recovery (DR) sites is described below with reference to FIG. 5. As depicted in block 502, a large transfer of replication data including accumulated changes made to data of a production volume since the most recent synchronization to a replica volume is received in an asynchronous replication process. As depicted in block 504, the large transfer of replication data is partitioned into a plurality of small write requests. As depicted in block 506, each small write request is tagged as a write request to the replica volume. As depicted in block 508, in response to servicing the plurality of small write requests, one or more of (i) early evicting, from cache memory, all cache pages used to cache host data specified in the plurality of small write requests, (ii) deep compression of contiguous host data specified in the plurality of small write requests, (iii) stream separation on the plurality of small write requests, each small write request being further tagged as corresponding to a specific production site, and (iv) flushing host data having the same retention period to a specific region of physical storage space for the replica volume, each small write request being further tagged with hint information pertaining to the retention period, are performed. In this way, the performance and/or efficiency of storage systems deployed at DR sites can be improved.

Several definitions of terms are provided below for the purpose of aiding the understanding of the foregoing description, as well as the claims set forth herein.

As employed herein, the term "storage system" is intended to be broadly construed to encompass, for example, private or public cloud computing systems for storing data, as well as systems for storing data comprising virtual infrastructure and those not comprising virtual infrastructure.

As employed herein, the terms "client", "host", and "user" refer, interchangeably, to any person, system, or other entity that uses a storage system to read/write data.

As employed herein, the term "storage device" may refer to a storage array including multiple storage devices. Such a storage device may refer to any non-volatile memory (NVM) device, including hard disk drives (HDDs), solid state drives (SSDs), flash devices (e.g., NAND flash devices, NOR flash devices), and/or similar devices that may be accessed locally and/or remotely, such as via a storage area network (SAN).

As employed herein, the term "storage array" may refer to a storage system used for block-based, file-based, or other object-based storage. Such a storage array may include, for example, dedicated storage hardware containing HDDs, SSDs, and/or all-flash drives.

As employed herein, the term "storage entity" or "storage object" may refer to a filesystem, an object storage, a virtualized device, a logical unit (LUN), a logical volume (LV), a logical device, a physical device, and/or a storage medium.

As employed herein, the term "LUN" may refer to a logical entity provided by a storage system for accessing data from the storage system and may be used interchangeably with a logical volume (LV). The term "LUN" may also refer to a logical unit number for identifying a logical unit, a virtual disk, or a virtual LUN.

As employed herein, the term "physical storage unit" may refer to a physical entity such as a storage drive or disk or an array of storage drives or disks for storing data in storage locations accessible at addresses. The term "physical storage unit" may be used interchangeably with the term "physical volume".

As employed herein, the term "storage medium" may refer to a hard drive or flash storage, a combination of hard drives and flash storage, a combination of hard drives, flash storage, and other storage drives or devices, or any other suitable types and/or combinations of computer readable storage media. Such a storage medium may include physical and logical storage media, multiple levels of virtual-to-physical mappings, and/or disk images. The term "storage medium" may also refer to a computer-readable program medium.

As employed herein, the term "IO request" or "IO" may refer to a data input or output request such as a read request or a write request.

As employed herein, the terms, "such as", "for example", "e.g.", "exemplary", and variants thereof refer to non-limiting embodiments and have meanings of serving as examples, instances, or illustrations. Any embodiments described herein using such phrases and/or variants are not necessarily to be construed as preferred or more advantageous over other embodiments, and/or to exclude incorporation of features from other embodiments.

As employed herein, the term "optionally" has a meaning that a feature, element, process, etc., may be provided in certain embodiments and may not be provided in certain other embodiments. Any particular embodiment of the present disclosure may include a plurality of optional features unless such features conflict with one another.

While various embodiments of the present disclosure have been particularly shown and described, it will be understood by those skilled in the art that various changes in form and details may be made therein without departing from the scope of the present disclosure, as defined by the appended claims.

What is claimed is:

1. A method of improving performance and efficiency of storage systems deployed at disaster recovery (DR) sites, comprising:

receiving, at a destination node of a DR site from a source node at a production site, a large transfer of replication data including accumulated changes made to data of a production volume stored at the production site since a most recent synchronization of the production volume to a replica volume stored at the DR site in an asynchronous replication process, wherein any replication data stored in the replica volume at the DR site is written more frequently than the replication data is read;

partitioning the large transfer of replication data into a plurality of small write requests directed toward the replica volume stored at the DR site;

tagging each small write request of the plurality of small write requests with multiple tags to obtain a plurality of multi-tagged small write requests, the multiple tags including a first tag indicating a target type of a write target of the small write request, a second tag identifying the production site where the production volume is stored, and a third tag containing hint information pertaining to a data retention period of the replication data stored at the DR site, the write target of the small write request being the replica volume at the DR site, the target type of the write target being the replica volume at the DR site of the production volume at the production site; and in response to servicing the plurality of multi-tagged small write requests, performing at least one of:

stream separation on the plurality of multi-tagged small write requests, the production site being a specific production site, the stream separation being performed based on the target type of the write target being the replica of the production volume as indicated by the first tag, and the production site being the specific production site as identified by the second tag; and flushing the replication data stored in the replica volume at the DR site having an identical data retention period to a specific region of physical storage space for the replica volume, the flushing of the replication data being performed based on the target type of the write target being the replica at the DR site of the production volume at the production site as indicated by the first tag, and the hint information pertaining to the data retention period of the replication data stored at the DR site as contained in the third tag.

2. The method of claim 1 comprising:
in response to servicing the plurality of multi-tagged small write requests, further performing at least one of:
early evicting, from cache memory, all cache pages used to cache the replication data specified in the plurality of multi-tagged small write requests, the early evicting being performed based on the target type of the write request being the replica of the production volume as indicated by the first tag; and
deep compression of a large amount of logically contiguous blocks in the replication data specified in the plurality of multi-tagged small write requests, the deep compression being performed, by the destination node, at a high compression ratio before the large amount of logically contiguous blocks is flushed to the replica volume, the deep compression being performed based on the target type of the write request being the replica of the production volume as indicated by the first tag.

3. The method of claim 2 wherein the performing early evicting, from the cache memory, all cache pages used to cache the replication data specified in the plurality of multi-tagged small write requests includes writing the changes made to the data of the production volume to a cache page in the cache memory.

4. The method of claim 3 wherein the performing early evicting, from the cache memory, all cache pages used to cache the replication data specified in the plurality of multi-tagged small write requests includes flushing the changes from the cache memory to the replica volume, and evicting the cache page from the cache memory in response to flushing the changes from the cache memory to the replica volume.

5. The method of claim 4 wherein the performing early evicting, from the cache memory, all cache pages used to cache the replication data specified in the plurality of multi-tagged small write requests includes returning the cache page to a free page list of the cache memory.

6. The method of claim 4 wherein the performing early evicting, from the cache memory, all cache pages used to cache the replication data specified in the plurality of multi-tagged small write requests includes placing the cache page at a head of a least recently used (LRU) list of the cache memory.

7. The method of claim 2 wherein the performing deep compression of the large amount of logically contiguous blocks in the replication data specified in the plurality of multi-tagged small write requests includes performing inline deep compression of the large amount of logically contiguous blocks by the destination node.

8. The method of claim 2 wherein the performing deep compression of the large amount of logically contiguous blocks in the replication data specified in the plurality of multi-tagged small write requests includes writing a compressed version of the large amount of logically contiguous blocks to a cache page in the cache memory.

9. The method of claim 8 wherein the performing deep compression of the large amount of logically contiguous blocks in the replication data specified in the plurality of multi-tagged small write requests includes flushing the compressed version of the large amount of logically contiguous blocks from the cache memory to the replica volume.

10. The method of claim 1 wherein the performing stream separation on the plurality of multi-tagged small write requests includes tagging each multi-tagged small write request with the second tag, the second tag including a production site identifier (ID) identifying the specific production site where the production volume is stored.

11. The method of claim 10 wherein the performing stream separation on the plurality of multi-tagged small write requests includes performing inline stream separation on the plurality of multi-tagged small write requests based at least on the production site ID included in the second tag.

12. The method of claim 11 wherein the production site mandates a specific class of service (CoS) for providing backup or remote storage of replication data, and wherein the performing stream separation on the plurality of multi-tagged small write requests includes, for each stream of small write request transactions resulting from performing the stream separation, performing write operations to write, to the replica volume, the changes made to the data of the production volume for subsequent storage to a storage tier that conforms to the specific CoS mandated by the production site.

13. The method of claim 1 wherein the performing flushing replication data having the identical retention period to the specific region of physical storage space for the replica volume includes tagging each multi-tagged small write request with the third tag containing the hint information pertaining to the identical retention period of the replication data.

14. A system for improving performance and efficiency of storage systems deployed at disaster recovery (DR) sites, comprising:
a memory; and
processing circuitry configured to execute program instructions out of the memory to:
receive, at a destination node of a DR site from a source node at a production site, a large transfer of replication data including accumulated changes made to data of a production volume stored at the production site since a most recent synchronization of the production volume to a replica volume stored at the DR site in an asynchronous replication process, wherein any replication data stored in the replica volume at the DR site is written more frequently than the replication data is read;
partition the large transfer of replication data into a plurality of small write requests directed toward the replica volume stored at the DR site;
tag each small write request of the plurality of small write requests with multiple tags to obtain a plurality of multi-tagged small write requests, the multiple tags including a first tag indicating a target type of a write target of the small write request, a second tag identifying the production site where the production volume is stored, and a third tag containing hint information pertaining to a data retention period of the replication data stored at the DR site, the write target of the small write request being the replica volume at the DR site, the target type of the write target being the replica at the DR site of the production volume at the production site; and
in response to servicing the plurality of multi-tagged small write requests, perform at least one of:
stream separation on the plurality of multi-tagged small write requests, the production site being a specific production site, the stream separation being performed based on the target type of the write target being the replica of the production volume as indicated by the first tag, and the production site being the specific production site as identified by the second tag; and flushing the replication data stored in the replica volume at the DR site having an identical data retention period to a specific region of physical storage space for the replica volume, the flushing of the replication data being performed based on the target type of the write target being the replica at the DR site of the production volume at the production site as indicated by the first tag, and the hint information pertaining to the data retention period of the replication data stored at the DR site as contained in the third tag.

15. The system of claim 14 wherein the processing circuitry is configured to execute the program instructions out of the memory to:

write the changes made to the data of the production volume to a cache page in the cache memory; and perform one of (i) returning the cache page to a free page list of the cache memory, and (ii) placing the cache page at a head of a least recently used (LRU) list of the cache memory.

16. The system of claim 14 wherein the processing circuitry is configured to execute the program instructions out of the memory to perform inline deep compression of a large amount of logically contiguous blocks in the replication data by the destination node, the inline deep compression being performed based on the target type of the write request being the replica of the production volume as indicated by the first tag.

17. The system of claim 14 wherein the processing circuitry is configured to execute the program instructions out of the memory to:

tag each multi-tagged small write request with the second tag, the second tag including a production site identifier (ID) identifying the specific production site where the production volume is stored; and perform inline stream separation on the plurality of multi-tagged small write requests based at least on the production site ID included in the second tag.

18. The system of claim 14 wherein the processing circuitry is configured to execute the program instructions out of the memory to:

tag each multi-tagged small write request with the third tag containing the hint information pertaining to the data retention period of the replication data.

19. A computer program product including a set of non-transitory, computer-readable media having instructions that, when executed by processing circuitry, cause the processing circuitry to perform a method comprising:

receiving, at a destination node of a DR site from a source node at a production site, a large transfer of replication data including accumulated changes made to data of a production volume stored at the production site since a most recent synchronization of the production volume to a replica volume stored at the DR site in an asynchronous replication process, wherein any replication data stored in the replica volume at the DR site is written more frequently than the replication data is read;

partitioning the large transfer of replication data into a plurality of small write requests directed toward the replica volume stored at the DR site;

tagging each small write request of the plurality of small write requests with multiple tags to obtain a plurality of multi-tagged small write requests, the multiple tags including a first tag indicating a target type of a write target of the small write request, a second tag identifying the production site where the production volume is stored, and a third tag containing hint information pertaining to a data retention period of the replication data stored at the DR site, the write target of the small write request being the replica volume at the DR site, the target type of the write target being the replica at the DR site of the production volume at the production site; and in response to servicing the plurality of multi-tagged small write requests, performing at least one of:

stream separation on the plurality of multi-tagged small write requests, the production site being a specific production site, the stream separation being performed based on the target type of the write target being the replica of the production volume as indicated by the first tag, and the production site being the specific production site as identified by the second tag; and flushing the replication data stored in the replica volume at the DR site having an identical data retention period to a specific region of physical storage space for the replica volume, the flushing of the replication data being performed based on the target type of the write target being the replica at the DR site of the production volume at the production site as indicated by the first tag, and the hint information pertaining to the data retention period of the replication data stored at the DR site as contained in the third tag.

* * * * *